United States Patent [19]
Hofer et al.

[11] 3,716,586
[45] Feb. 13, 1973

[54] NEW 2-HYDROXY-3,5-DI-(TERT. BUTYL)-BENZOPHENONES

[75] Inventors: Kurt Hofer, Münchenstein/BL; Rudolf Kessler, Reinach/BL, both of Switzerland

[73] Assignee: Sandoz Ltd. (also known as Sandoz AG), Basle, Switzerland

[22] Filed: July 16, 1970

[21] Appl. No.: 55,604

[30] Foreign Application Priority Data

July 25, 1969    Switzerland..................11367/69

[52] U.S. Cl..................260/591, 260/45.95
[51] Int. Cl..............................C07c 49/82
[58] Field of Search.........................260/591

[56] References Cited

UNITED STATES PATENTS 3,255,113    6/1966    Coffield..........................252/52 R

OTHER PUBLICATIONS

Shulgin et al., Chem. Abstracts 65, 2012a (1966)

Primary Examiner—Daniel D. Horwitz
Attorney—Gerald D. Sharkin, Robert S. Honor, Frederick H. Weinfeldt, Richard E. Vila and Walter F. Jewell

[57] ABSTRACT

New 2-Hydroxy-3,5-di-(tert. butyl)-benzophenones of Formula

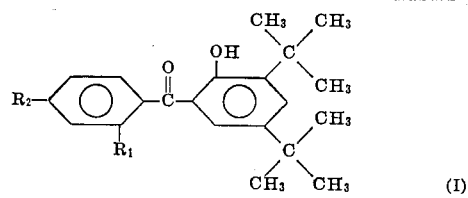

wherein $R_1$ stands for hydrogen or lower alkyl and $R_2$ for hydrogen or alkyl or for phenyl, phenoxy or phenylmercapto which may be substituted by alkyl, chlorine or bromine are prepared by a Friedel-Crafts condensation reaction and are useful as ultraviolet absorbers.

7 Claims, No Drawings

NEW 2-HYDROXY-3,5-DI-(TERT. BUTYL)-BENZOPHENONES

It is known that 2-hydroxybenzophenones can be produced by a Friedel-Crafts condensation reaction involving aluminum chloride, benzoyl chloride and a substituted phenol. If a phenol substituted by a branched alkyl radical is used, it is observed that the latter radical is unstable under Friedel-Crafts conditions. For this reason phenols so substituted are not suitable starting materials for this method of production (cf. French Pat. No. 1,408,503, page 1, first column, paragraph 2). Accordingly it is to be assumed that the synthesis of 2-hydroxybenzophenones by a Friedel-Crafts condensation reaction will present special difficulty if the benzene ring bearing the hydroxyl group is substituted by two branched alkyl radicals, since two unstable radicals are then present and the reaction conditions are more energetic owing to the higher degree of substitution.

The surprising observation has now been made that 2-hydroxybenzophenones which are substituted by two tertiary butyl radicals in the benzene ring bearing the hydroxyl group can be successfully produced by a Friedel-Crafts condensation reaction.

The present invention relates to new 2-hydroxy-3,5-di-(tert. butyl)-benzophenones of formula

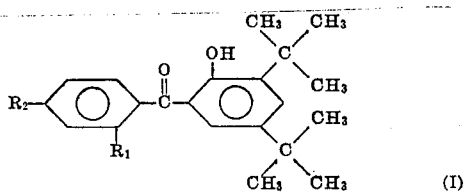

wherein $R_1$ stands for hydrogen or a lower alkyl radical and $R_2$ for hydrogen or an alkyl radical or for a phenyl, phenoxy or phenylmercapto radical which may be substituted by alkyl groups, chlorine or bromine. The process for the production of the benzophenones of formula (I) comprises condensing 1 mole of a compound of formula

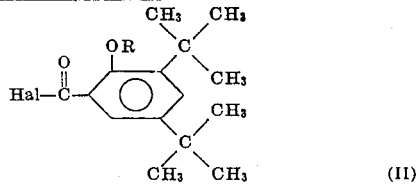

wherein Hal represents chlorine or bromine and R a lower alkyl radical, with 1 mole of a compound of formula

according to Friedel-Crafts, with heating of the reaction mixture for replacement of the radical R by hydrogen.

The lower alkyl radical $R_1$ in formula (I) may be, for example, ethyl, n-propyl, n-butyl, iso-butyl or n-amyl. But the preferred meanings of $R_1$ are hydrogen and methyl. Examples of suitable alkyl radicals $R_2$ are methyl, ethyl, n-propyl, iso-propyl, n-butyl, tert. butyl, n-amyl, n-octyl, 2-ethyl-hexyl, tert. octyl, 2,6,8-trimethyl-4-nonyl, iso-octyl, n-decyl, n-dodecyl, cetyl, stearyl, docosanyl (behenyl). Alkyl radicals of this type may also occur as substituents on the benzene ring of the phenyl, phenoxy or phenylmercapto radicals $R_2$. These latter radicals may also be substituted by chlorine or bromine, but they are preferably unsubstituted.

In formula (II) Hal is preferably chlorine, because this is easily accessible, and R is preferably methyl.

The preferred starting materials of formula (III) are diphenyl ether, diphenyl and diphenyl sulphide, which may be unsubstituted or substituted in 4-position by an alkyl radical.

The reaction is carried out in two steps. In the first step the reactants are condensed under anhydrous conditions to a 2-alkoxybenzophenone (cf. Alah, "Friedel-Crafts and Related Reactions" (1964) and The Merck Index, 7. E. p. 1428 (1960); in the second step the alkoxy group is converted into the hydroxyl group. The Friedel-Crafts condensation must be conducted under such mild conditions that no change takes place in the alkoxy group -OR in formula (II). The danger of isomerization or cleavage of the tertiary butyl radicals is thereby precluded. Any of the known Friedel-Crafts catalysts, e.g., tin tetrachloride, ferric chloride, aluminum bromide, aluminum chloride or an addition product of aluminum chloride and an alkali metal chloride (NaCl,KCl,LiCl) may be employed, aluminum chloride in an inert organic solvent being especially suitable. As inert organic solvents the following can be mentioned: carbon disulphide, methylene chloride, chloroform, carbon tetrachloride, dichloro- or tetrachlorethane, chlorobenzene, bromobenzene, ortho-di-chlorobenzene and nitrobenzene or an excess of the aromatic compound of formula (III). The conditions are sufficiently mild provided the process is carried out at temperatures below 50° C, preferably between −10° C and +25° C.

In the second step the 2-alkoxybenzophenone is converted into the 2-hydroxybenzophenone. This could be accomplished by acid hydrolysis, for instance by treating with hydrobromic acid in a lower alkanoic acid, such as anhydrous propionic acid and especially in glacial acetic acid at temperatures ranging from room temperature (about 18°–20° C) to the boiling point of the mixture, but preferably at 60°–100° C. In the present process, however, it has been found that there is no necessity to work up the reaction mixture after the first step and to add reagents for the second step. On completion of the first step it is sufficient to increase the temperature of the crude reaction mixture, for example to 50°–100° C, to effect the following step, in which the radical R is converted into the corresponding alkyl halide and the hydroxyl group in the 2-position of the benzophenone set free. In this case it is advisable to carry out the Friedel-Crafts condensation in an inert organic solvent having a boiling point of about 100° C or higher.

Thus the second step of the reaction is carried out under energetic Friedel-Crafts conditions without the tertiary butyl radicals being changed or split off, in spite of the fact that they are bound to a benzene ring bearing a hydroxyl group. This stability was not to be expected from the present state of knowledge in this field of synthesis (cf. the opening paragraph of this specification). The reason for this surprising stability is probably to be found in the fact that the keto group in ortho-position influences the hydroxyl group in such a manner that its potential effect upon the instability of the tertiary butyl radicals is very largely inhibited.

The resulting ortho-hydroxybenzophenones are isolated by standard methods. The reaction mixture is first entered into an aqueous acid phase to decompose the metal complex formed, upon which the crude compound settles out. It is purified by crystallization from alcohol, ethyl acetate, methylethyl ketone, toluene or benzene, or by washing with a suitable organic solvent.

The present invention relates further to the use of the new compounds of formula (I) as ultra-violet (UV) absorbers.

For this purpose the new compounds are either incorporated in the product or material sensitive to UV radiation, or applied to its surface to form a protective film. By absorbing ultra-violet rays they protect these light-sensitive substances from degradation. They have a wide range of application in the processing of plastics; to name some examples, they can be employed as UV-absorbers for cellulose acetate, cellulose propionate, cellulose acetobutyrate, polyethylene, polypropylene, polyvinyl chloride, polyvinyl chloride-acetate, polyamides, polystyrene, ethyl cellulose, cellulose nitrate, polyvinyl alcohol, silicon rubber, melamine-formaldehyde and urea-formaldehyde resins, allyl cast resins, polymethylmethacrylate, polyesters and polyacrylonitrile.

The compounds can also be used to protect natural products such as rubber, cellulose, wool and silk from UV radiation.

The products or materials for protection may be present in the form of sheet or film, panels, tubing, rods, tapes, coatings, fibers, granules, powders or other solid forms, or as solutions, emulsions or dispersions. The UV-absorbers are incorporated in, or applied to, these materials by the known methods. One of the main methods of application is intimate mixing of the UV-absorber and the plastic material, e.g., polypropylene granules, in a kneading or other suitable machine and extrusion moulding of the mixture. This technique ensures homogeneous blending, which is important for effective protection. Extrusion moulding is employed to produce a variety of products, including films, tubing and filaments. The latter can be converted into woven fabrics.

If polypropylene, for instance, is to be processed as woven fabric the UV-absorber is normally mixed with it prior to extrusion as filament yarn. However, these new UV-absorbers can be applied with equally good effect to textile yarns and fabrics, for example from an aqueous bath containing the compound of formula (I) in superfine dispersion. Textiles of polyester and cellulose acetate fibers are suitable for this exhaust method of application.

The plastics need not necessarily be polymerized when the new compounds are added. The latter can be blended with the monomers or prepolymers prior to the condensation or other polymerization reaction yielding the final polymer.

Besides their use for the stabilization of clear films, plastics and the like, the new UV-absorbers are suitable for application in or an opaque, semi-opaque and translucent materials having a surface which is subject to degradation by UV radiation. Examples of such materials are foamed plastics, opaque film and sheeting, opaque papers, transparent and opaque pigmented plastics, fluorescent pigments and automobile and furniture polishes, creams, lotions and similar products, which latter group of products may be opaque, clear or translucent.

In comparison with the nearest related 2-hydroxybenzophenones, which contain only one branched alkyl radical in the phenol nucleus, the new compounds are more readily soluble, or can be homogeneously dispersed with greater ease, in the materials requiring protection from UV radiation, and are more stable to light and weathering.

The compounds of formula (I) can be employed in conjunction with other agents for protection from light and with stabilizers. Mixtures of such active substances often exercise a synergetic effect and protect the treated materials from ultra-violet radiation, heat and oxidative degradation.

For adequate protection from ultra-violet radiation it is essential to incorporate the new compounds in the materials, or to apply them to the materials as a film or coat. For example, light-sensitive foodstuffs such as fruit, cooking fats and butter can be protected by packaging in plastic film containing a compound of formula (I).

The present invention relates further to the materials which contain compounds of formula (I) for protection from ultraviolet radiation. As is shown in some of the following Examples, the new compounds can be incorporated in the materials at any stage of processing using the known methods. The amounts employed may vary within wide limits, e.g., from 0.01 to 5 percent, or preferably from 0.05 to 1 percent, in relation to the weight of the material for protection.

In the following examples F denotes the melting point, Kp the boiling point and λ the wavelength. The parts and percentages are by weight and the temperatures in degrees centigrade.

EXAMPLE 1

42.55 Parts of diphenyl ether and 70.7 parts of 2-methoxy-3,5-di-(tert.butyl)-benzoyl chloride (molar amounts) are dissolved in 200 parts of chlorobenzene. By external cooling the temperature of the solution is held at −2° to −5°, while with constant stirring 33.4 parts of anhydrous aluminum chloride are slowly added; the time required for addition varies from 30 minutes to 3 hours depending on the degree of cooling necessary to conduct off the heat of reaction. Following the entry of the aluminum chloride acylation commences with the development of hydrogen chloride. When this has largely abated, the temperature is slowly increased to 20°–30° and after 1 to hours it is raised further to 85°–95° to split the methylaryl ether. When cleavage of the methyl chloride is complete a mixture of hydrochloric acid and ice is entered with stirring. The aqueous layer is discarded and the organic layer washed thoroughly with hot water. The chlorobenzene is then distilled with vacuum, leaving the crude 2-hydroxy-3,5-di-(tert.butyl)-4′-phenoxybenzophenone. This is dissolved in boiling benzine (boiling range 100°–120°) and the solution allowed to cool, on which it settles out in the form of yellowish crystals which are soluble in alcohol, acetone, dioxan, toluene and chlorinated hydrocarbons.

In an analogous manner the two halogenated compounds of formula (IVa) and (IVb) below are obtained, using in place of diphenyl ether an equimolar amount of p-chlorodiphenyl ether and p-bromodiphenyl ether respectively:

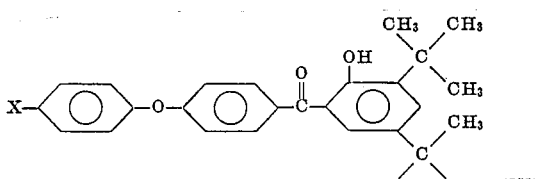

(IVa): X=chlorine
(IVb): X=bromine

The 2-methoxy-3,5-di-(tert.butyl)-benzoyl chloride used as starting material in this Example can be prepared as given in the following.

3,5-Di-(tert.butyl)-salicylic acid, which is accessible by carboxylation of 2,4-di-(tert.butyl)-phenol by the method described by Meek and Fuchsman in J. Chem. Eng. Data 14, 388–391, 1969, is esterified with methanol to give 3,5-di-(tert.butyl)-salicylic acid methyl ester. (Alternatively this can be obtained by butylation of methyl salicylate; cf. Federova, Kustanovic and Isaguljanc, Z. prikl. Chim. 40, 631–635, 1967). 257 Parts of the ester are mixed with 260 parts of acetone and 171 parts of dimethyl sulphate. A concentrated aqueous solution of 108 parts of sodium hydroxide is added at a sufficiently slow rate to allow the inside temperature to be kept at 25°–45° by external cooling. When no further phenolic hydroxyl group is indicated the acetone is distilled, the residue diluted with 97.5 parts of methanol, 243 parts of water and 129 parts of 30 percent sodium hydroxide solution, and the resulting solution boiled for several hours with reflux to effect hydrolysis of the methyl ester. Afterwards the solution is diluted further with 450 parts of water and adjusted to pH 2 with concentrated sulphuric acid. The 2-methoxy-3,5-di-(tert. butyl)-benzoic acid, which then settles out, is dissolved at 70° by the addition of 335 parts of toluene. After separation from the aqueous layer the toluene solution is washed with 300 parts of hot water, then 153 parts of the toluene are distilled. The concentrated, dry solution remaining is allowed to cool to 0.5°, on which the 2-methoxy-3,5-di-(tert.butyl)-benzoic acid settles out in the form of colorless crystals with a melting point at 162°–165°.

This acid can also be obtained directly from the aforenamed 3,5-di-(tert.butyl)-salicylic acid by methylation of the phenolic hydroxyl and the carboxyl group with dimethyl sulphate and subsequent hydrolysis as above.

For conversion into the chloride, 218 parts of 2-methoxy-3,5-di-(tert.butyl)-benzoic acid are mixed with 0.5 part of pyridine and 146 parts of thionyl chloride. The mixture is raised slowly to 55°–60°, at which temperature gas evolution beings and the slurry slowly liquifies. Stirring is continued for 5 hours at 60°, a small amount of excess thionyl chloride is removed with vacuum, and the 2-methoxy-3,5-di-(tert.butyl)-benzoyl chloride distilled in the form of a pale yellow honey, $Kp_{10}$ 150°–154°.

The 2-hydroxy-3,5-di-(tert.butyl)-4'-phenoxybenzophenone is also obtainable from a carboxylic acid chloride or bromide of formula (II), in which R represents a lower alkyl radical having more than one carbon atom.

Examples of final products of formula (I), produced by the aforedescribed process from 2-methoxy-3,5-di-(tert.butyl)-benzoyl chloride and a compound of formula (III), are listed in the table below.

TABLE

| Expl. No. | Starting material of formula (III) | Substituents in formula (I) $R_1$ | $R_2$ | F °C | λ max nm |
|---|---|---|---|---|---|
| 1 | diphenyl ether | H | –⟨O⟩–O– | 114–116 | |
| 2 | m-xylene | $CH_3$ | $CH_3$– | 66–67 | |
| 3 | iso-propyl-benzene | H | $(CH_3)_2CH$– | 83–85 | |
| 4 | tert. butyl-benzene | H | $(CH_3)_3C$– | 113–115 | |
| 5 | diphenyl | H | –⟨O⟩– | 158–160 | |
| 6 | diphenyl sulphide | H | –⟨O⟩–S– | 115–116 | |
| 7 | p-tert.butyl-di-phenyl ether | H | $(CH_3)_3C$–⟨O⟩–O– | yellowish resin | 270–300 340–355 |
| 8 | p-nonyldi-phenyl ether | H | $H_{19}C_9$–⟨O⟩–O– | yellowish resin | 270–300 340–355 |

EXAMPLES OF APPLICATION

A. Polypropylene granules are homogeneously mixed with 0.2 percent of the compound described in Example 1 at 180° by the normal method and the mixture is extruded in the form of panels of 0.3 mm thickness. From the same polypropylene panels are produced without the prior addition of a protective additive of this nature. The two panels are conparatively tested for resistance to climatic influences using the De La Rue test method; the conditions are 500 hours at 40° and 75 percent relative atmosphere humidity, with regular change of the air and illumination by 16 sun lamps and 16 Philips black lamps. On completion of the test the panel without an additive shows hair cracks and is brittle, while the comparative panel containing the compound according to this invention is unchanged.

B. Two panels of polyvinyl chloride are produced as given in A, one without an additive and the other with 0.1 percent of the compound specified in Example 5. After exposure for 500 hours under the conditions stated in A. The latter panel is unchanged, whereas the panel without a protective additive is brown and cracked.

C. Instead of the climatic test as in Examples A and B, test specimens can be exposed in the Xenotest apparatus. Polypropylene and polyvinyl chloride mouldings without a protective additive are degraded after exposure in this instrument for 800 and 3,000 hours respectively. A polypropylene specimen moulding containing 0.5 percent of the compound of Example 2 and a polyvinyl chloride specimen containing 0.1 percent of the compound of Example 4 withstand exposure for 1,000 and 4,000 hours respectively without adverse effect.

Having thus disclosed the invention what we claim is:

1. A 2-hydroxy-3,5-di-(tert.butyl)-benzophenone of the formula

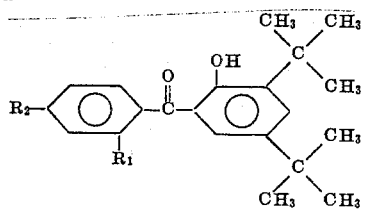

wherein $R_1$ is hydrogen or lower alkyl
and $R_2$ is phenyl, phenylmercapto or phenoxy and is optionally substituted by alkyl, chlorine or bromine.

2. A compound according to claim 1 wherein $R_1$ is hydrogen or methyl and $R_2$ is unsubstituted.

3. The 2-hydroxy-3,5-di-(tert.butyl)-benzophenone according to Claim 1 of formula

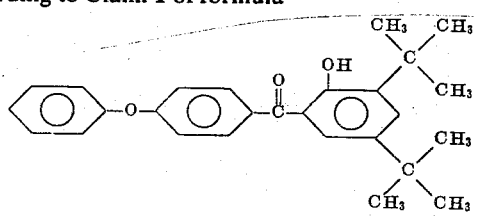

4. The 2-hydroxy-3,5-di-(tert.butyl)-benzophenone according to claim 1 of formula

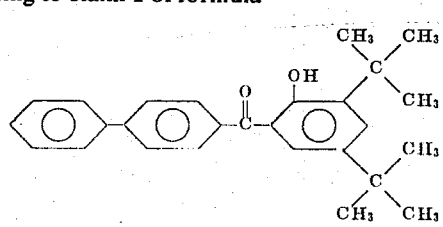

5. The 2-hydroxy-3,5-di-(tert.butyl)-benzophenone according to claim 1 of formula

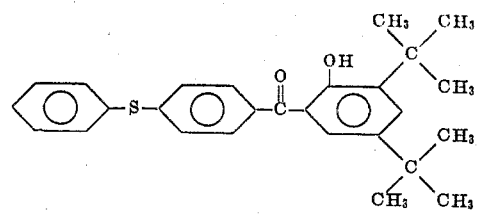

6. The 2-hydroxy-3,5-di-(tert.butyl)-benzophenone according to claim 1 of formula

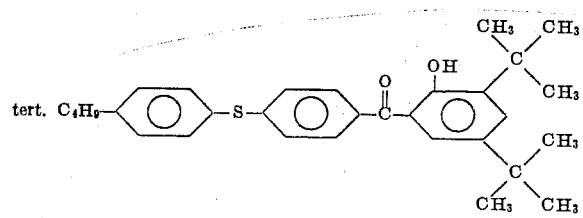

7. The process for producing a compound of the formula

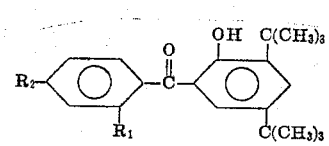

wherein $R_1$ is hydrogen or lower alkyl
$R_2$ is a member of the group consisting of hydrogen, alkyl with one to 22 carbon atoms, substituted or unsubstituted phenyl, substituted or unsubstituted phenylmercapto and substituted or unsubstituted phenoxy in which the substituents are alkyl, chlorine or bromine which comprises condensing 1 mole of a compound of the formula

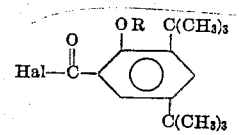

wherein Hal is chlorine or bromine and R is a lower alkyl radical with 1 mole of a compound of the formula

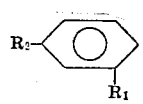

in the presence of a Friedel-Crafts catalyst at a temperature of −10° to 25° C. to form an intermediate reaction product and heating said reaction product at a temperature of 50° to 100° C.

* * * * *